UNITED STATES PATENT OFFICE.

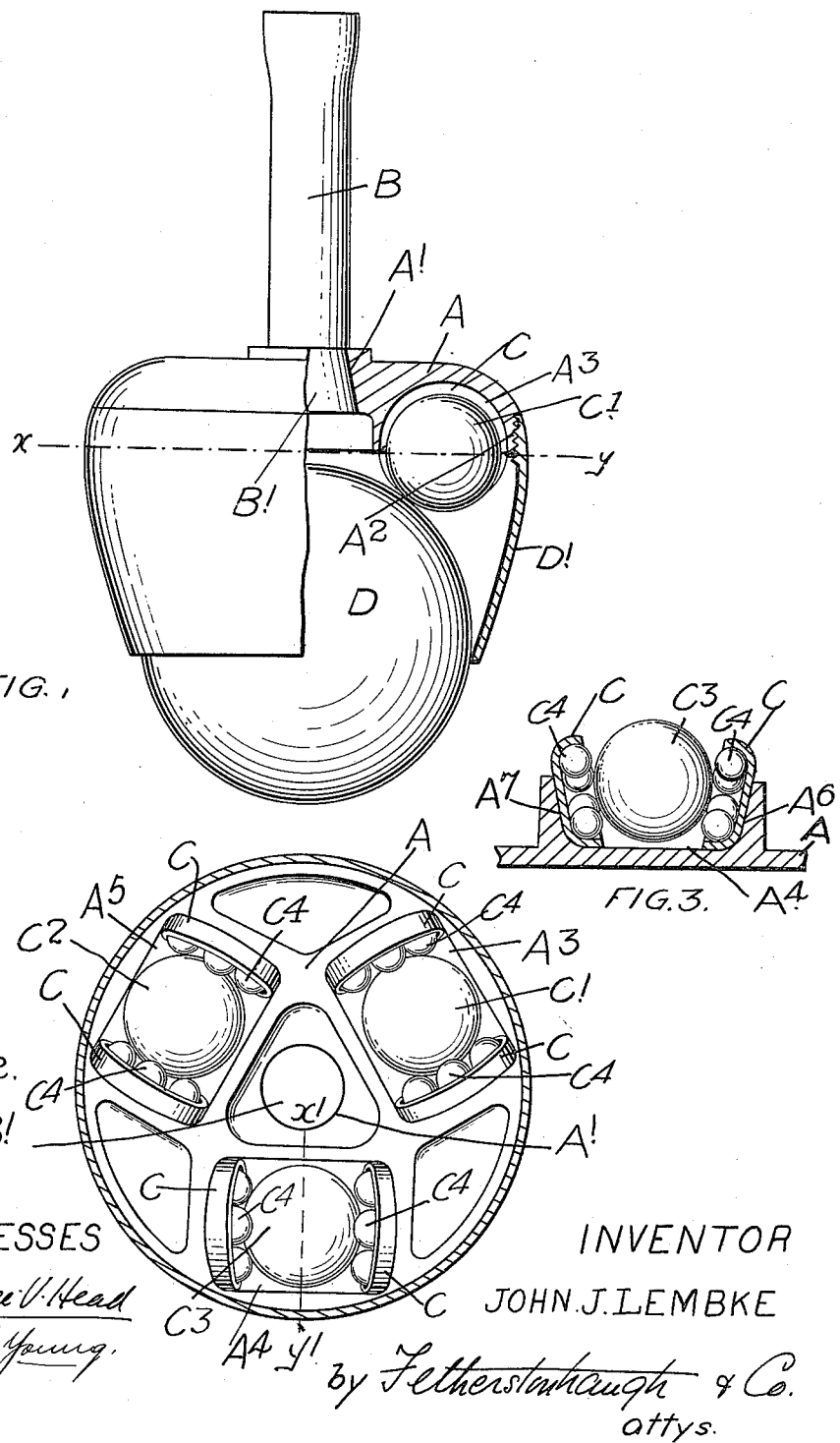

JOHN JACOB LEMBKE, OF BERLIN, ONTARIO, CANADA.

CASTER.

1,144,365. Specification of Letters Patent. Patented June 29, 1915.

Application filed December 28, 1914. Serial No. 879,321.

*To all whom it may concern:*

Be it known that I, JOHN JACOB LEMBKE, of the city of Berlin, in the county of Waterloo, in the Province of Ontario, Canada, have invented certain new and useful Improvements in Casters, of which the following is the specification.

My invention relates to improvements in casters and the object of the invention is to devise a ball caster which will have a free rotary movement in any direction when the ball is subject to outward thrust from the center of the caster due to its frictional contact with the ground as the ball travels over the surface and it consists essentially of a main ball, a housing extending over and around the main ball to a point slightly below the center thereof, a three-point intermediate ball bearing carried within the housing above the main ball and bearing upon the periphery of the main ball and supplemental minor annular ball bearings held within recesses in the housing against each side of each ball of the three-point bearing as hereinafter more particularly explained by the following specification.

Figure 1, is a side elevation of a caster constructed in accordance with my invention and partially broken away and in section. Fig. 2, is a sectional plan looking upward on line $x$—$y$ Fig. 1. Fig. 3, is a sectional detail on line $x'$—$y'$ Fig. 2.

In the drawings like letters of reference indicate corresponding parts in each figure.

A is an annular casting, the center orifice A' of which is preferably flared downwardly and the outer periphery of which is provided with an external threaded portion $A^2$.

B is the shank of the caster provided with a rivet head B' which is riveted into the center opening A' of the annular casting A. The annular casting A is provided with three pockts $A^3$, $A^4$ and $A^5$ in its under face, the end walls of such pockets being slightly inclined outwardly at $A^6$ and $A^7$, the bottom of the pocket being semi-circular in form.

C are cups forming circular ball races.

C', $C^2$ and $C^3$ are balls forming a three-point bearing.

$C^4$ are supplemental minor ball bearings held within the cups C to each side of the balls C', $C^2$ and $C^3$. The balls $C^4$ are arranged in circular form so that the convex face of the ball extends into the center of the circular bearing formed by the balls $C^4$, such balls $C^4$ forming a ring like bearing against the periphery of each ball C', $C^2$ and $C^3$.

D is the main ball which is surrounded by a housing D'. The lower end of the housing D' extends around the ball D in close contact with the ball slightly below the center thereof and yet in such a way as to allow of the ball running free when the load is placed thereon.

The upper end of the housing D' is provided with an internal thread which is screwed on to the external thread $A^2$ hereinbefore described, thereby carrying the ball D into contact with the periphery of the balls C', $C^2$ and $C^3$.

When the caster is in position in the structure to be supported thereby the ball D bears upon the floor and the upper portion of the periphery thereof against the balls C', $C^2$ and $C^3$, the balls C', $C^2$ and $C^3$ being carried by the opposing annular ball bearings $C^4$.

It will thus be seen that no matter in what direction the thrust comes upon the main ball D as it is forced over the surface of the ground that such thrust will be taken up by the ball bearings so as to allow of a free rotary movement of the main ball thereby making an easy and smooth running caster.

What I claim as my invention is:

In a ball caster, a main ball, a plurality of secondary balls forming bearings for said main ball, and two annular series of balls for each secondary ball forming lateral bearings therefor.

JOHN JACOB LEMBKE.

Witnesses:
W. H. BEAVER,
WM. WITT.

Copies of this patent may be obtained for five cents each, by addressing the "Commissioner of Patents, Washington, D. C."